(12) United States Patent
Meyer et al.

(10) Patent No.: US 8,765,624 B2
(45) Date of Patent: Jul. 1, 2014

(54) COATING SUSPENSION FOR COATING CATALYST SUBSTRATES

(75) Inventors: Ulrich Meyer, Clover Crescent (SG); Olaf Helmer, St. Augustin (DE); Sascha Podehl, Kiefersfelden (DE)

(73) Assignee: Sued-Chemie IP GmbH & Co. KG, Munich (DE)

( * ) Notice: Subject to any disclaimer, the term of this patent is extended or adjusted under 35 U.S.C. 154(b) by 0 days.

(21) Appl. No.: 13/481,264

(22) Filed: May 25, 2012

(65) Prior Publication Data

US 2013/0012378 A1  Jan. 10, 2013

Related U.S. Application Data

(63) Continuation of application No. PCT/EP2010/068094, filed on Nov. 24, 2010.

(30) Foreign Application Priority Data

Nov. 27, 2009  (DE) .......... 10 2009 056 145

(51) Int. Cl.
| | | |
|---|---|---|
| B01J 29/06 | (2006.01) | |
| B01J 21/00 | (2006.01) | |
| B01J 23/00 | (2006.01) | |
| B01J 23/10 | (2006.01) | |
| B01J 23/08 | (2006.01) | |

(52) U.S. Cl.
USPC .............. 502/66; 502/63; 502/242; 502/302; 502/325; 502/355

(58) Field of Classification Search
None
See application file for complete search history.

(56) References Cited

U.S. PATENT DOCUMENTS

| | | | | |
|---|---|---|---|---|
| 4,624,940 | A | * | 11/1986 | Wan et al. .................. 502/251 |
| 6,627,257 | B1 | | 9/2003 | Foerster et al. |
| 6,759,358 | B2 | * | 7/2004 | Huang et al. ................ 502/64 |
| 7,524,792 | B2 | | 4/2009 | Dieterle et al. |
| 2003/0040425 | A1 | | 2/2003 | Huang et al. |
| 2006/0251549 | A1 | * | 11/2006 | Kumar et al. ................ 422/180 |
| 2008/0200328 | A1 | | 8/2008 | Eberle et al. |
| 2009/0162649 | A1 | | 6/2009 | Tissler et al. |
| 2010/0069660 | A1 | | 3/2010 | Raichle et al. |
| 2011/0005211 | A1 | | 1/2011 | Tissler et al. |
| 2011/0044871 | A1 | | 2/2011 | Maletz et al. |

FOREIGN PATENT DOCUMENTS

| | | |
|---|---|---|
| DE | 100 63 162 A1 | 6/2002 |
| DE | 101 14 328 A1 | 10/2002 |
| GB | 1 504 060 A | 3/1978 |

OTHER PUBLICATIONS

Olhero et al(Particle segregation phenomena occurring during slip casting process, Ceramics International, 28 (2002) 377-386).*
International Search Report dated Mar. 28, 2011of international application PCT/EP 2010/068094 on which this application is based.

* cited by examiner

*Primary Examiner* — Melvin C Mayes
*Assistant Examiner* — Michael Forrest
(74) *Attorney, Agent, or Firm* — Walter Ottesen P.A.

(57) ABSTRACT

A coating suspension for coating catalyst substrates comprises at least two different particulate metal and/or semi-metal oxides with a sedimentation mass ($M_S$), characterized in that the sedimentation mass ($M_S$) of the particulate metal and/or semi-metal oxide with the smallest sedimentation mass is between 70% and 100% of the sedimentation mass of the particulate metal and/or semi-metal oxide with the largest sedimentation mass. Further, a method for producing a coating suspension, the use of the coating suspension to coat a catalyst substrate, as well as a catalyst produced using the coating suspension are disclosed.

13 Claims, No Drawings

US 8,765,624 B2

COATING SUSPENSION FOR COATING CATALYST SUBSTRATES

CROSS REFERENCE TO RELATED APPLICATIONS

This application is a continuation application of international patent application PCT/EP 2010/068094, filed Nov. 24, 2010, designating the United States and claiming priority from German application 10 2009 056 145.5, filed Nov. 27, 2009, and the entire content of both applications is incorporated herein by reference.

FIELD OF THE INVENTION

The present invention relates to a coating suspension for coating catalyst substrates as well as a method for producing the coating suspension according to the invention. In addition, the invention relates to the use of the coating suspension to coat catalyst substrates. Moreover, catalysts are provided which have been produced using the coating suspension according to the invention.

BACKGROUND OF THE INVENTION

Monolithic catalysts for cleaning exhaust gases, for example by oxidation of CO or hydrocarbons to $CO_2$ and water or by reduction of NOx with ammonia or urea to $N_2$ and water, or for decomposing urea or its thermal decomposition product, isocyanic acid, to ammonia and $CO_2$, have been known for some time.

As a rule, these catalysts are constructed by covering a channelled monolithic support material (honeycomb) with a coating (washcoat) having a large surface area, for example consisting of $Al_2O_3$, $SiO_2$, $SnO_2$ or $TiO_2$, and applying to these metal-oxide surfaces the actually catalytically active metals or metal compounds, such as for example noble metals or transition metal oxides, and optionally additional promoter compounds/dopants. However, there are also applications in which the metal oxide coatings alone are catalytically active. A typical application example for this is the hydrolysis of isocyanic acid to ammonia with $TiO_2$-coated honeycombs.

The honeycombs consist either of a so-called honeycomb body which can be composed of a honeycomb casing and a support inserted therein, in particular a partially structured and coiled metal foil, or consist entirely of a ceramic shaped body. The honeycombs are substantially pervaded by channels running parallel to the axis of the honeycombs.

For example, materials such as cordierite, steatite, Duranit® or silicon carbide, or shaped bodies consisting of silicon dioxide, aluminum oxides, aluminates or also metals and metal alloys are used as support material for honeycombs consisting of ceramic shaped bodies. The use of metals and metal alloys makes it possible in particular to produce honeycomb bodies with complex structures, such as for example honeycombs with open channel structures or with complex mixed systems.

As a rule, a honeycomb-shaped catalyst is produced by applying a washcoat (WC) to the channel walls (coating), followed by drying, then calcining at high temperatures for solidification, and finally surface engineering of the washcoat. Then the catalytically active components are applied to the washcoat by impregnation steps, usually from the aqueous solutions of their precursors. However, it is also possible to apply the active components or their precursor compounds directly with the coating process. This is carried out as a rule by impregnating the powder which is used to produce the washcoat with active components or their precursor compounds, whereupon drying and calcining take place.

The coating of a honeycomb body with the inorganic materials with a large surface area is possible using various methods. As a rule, a suspension of the inorganic support oxide in water is first produced, optionally with the addition of additives, such as inorganic binders, surfactants, catalytic active components, pore formers, rheology adjuvants and other additives, whereupon the honeycomb body is filled with this so-called coating suspension by an immersion, suction or pumping process.

Methods are described with which only the precisely calculated quantity of coating suspension (also called washcoat suspension) that is to remain in the honeycomb is introduced, and this quantity is distributed as evenly as possible on the channel walls.

In other methods, an excess of coating suspension is introduced into the honeycomb (e.g. flow-coating the honeycomb), whereupon a removal procedure is carried out, with which excess coating suspension is discharged. The removal can be carried out for example by blowing out by means of an air flow or by extraction by suction.

Several of these method variants are cited and described in U.S. Pat. No. 6,627,257. The removal of the excess coating suspension from the honeycomb by means of a centrifuge unit is described for example in GB 1504060.

Honeycombs with high cell densities, as well as honeycombs with perforated channels with complex structure (open structures) require special coating methods, in particular as blowing out the excess coating suspension with air is no longer possible with open channel structures. With such honeycombs, therefore, centrifugation is used to remove the excess coating suspension.

The use of vibrations during the application of the washcoat is described in DE 101 14 328 A1. Thus, on the one hand, the flowability of the coating suspension is to be improved and, on the other hand, the washcoat application is to be as even as possible.

A method is known from United States patent application publication 2008/0200328 for removing the excess of a washcoat suspension used to coat a honeycomb body having channels. In this case, the excess is removed with the help of a porous support that is applied to the end face of the honeycomb body on which the excess is to be discharged (discharge end). The average pore diameter of the porous support used is identical to or smaller than the average diameter of the channels of the honeycomb body.

A disadvantage of the known coating suspensions is that a sedimentation of the solid constituents at different speeds often results during the coating process, i.e. in particular as long as the coating suspension has not yet been dried. Within the framework of the present invention, it has been found that the sedimentation speeds of the solid, particulate constituents of the coating suspension differ and affect the coating process. Regardless of the coating method used, the result of the sedimentation process is that the constituents that sediment quickly sink more quickly in the coating suspension and are the first to be deposited on the catalyst substrate. An unevenly coated product is therefore obtained due to the change in the solids content of the coating suspension that takes place during the coating procedure. A further problem is that, to avoid a predominant sedimentation of the constituents that sediment more quickly in a container in which the coating suspension is present, constant stirring is needed.

The different sedimentation speeds of the particles therefore result in an inhomogenization of the suspension, with the result that the quantity ratios of the particles change in relation to one another. In addition, due to the uneven deposition of the constituents, the quantity ratios of the differently sized particles in the liquid coating suspension and in the deposited coating also change dependent on time. Thus, the ratio of the different particles to each other in the coating suspension then differs from the ratio of the different particles to each other in the already deposited coating. In particular if an excess of the coating suspension is again extracted from the catalyst substrate by suction, neither the composition of the applied coating nor the composition of the excess of the coating suspension extracted by suction corresponds to the composition of the solid constituents of the coating suspension originally used.

In addition, the different sedimentation speeds can lead to a coating that consists of individual layers in which the deposited constituents are present, separated from each other in layers according to their different sedimentation speeds. This is extremely disadvantageous for the properties of the catalyst, as above all the outermost layer, which is in contact with the reaction gases, is responsible for the catalytic activity and a homogeneous distribution of the constituents of the coating suspension in the outer layer of the catalyst is most advantageous.

In order to show this sedimentation effect, within the framework of the present invention a coating suspension which comprised aluminum oxide that was impregnated with platinum (black oxide) and a zeolite white in color was applied to a catalyst substrate and dried overnight. The resultant coating had two layers, one lower, white layer and one upper, black layer. This experiment shows that the zeolite has a higher sedimentation speed than the aluminum oxide and these different sedimentation speeds of the particles lead to a layered deposition of the two constituents of the coating suspension.

SUMMARY OF THE INVENTION

The object of the present invention was therefore to provide a coating suspension which does not have the above-named disadvantages, as well as a method for producing it.

The object according to the invention is achieved in that a coating suspension which contains constituents with similar sedimentation speeds and a method for producing it are provided.

The invention therefore relates to a coating suspension for coating catalyst substrates, comprising at least two different particulate metal and/or semi-metal oxides with a sedimentation mass $M_S$, characterized in that the sedimentation mass $M_S$ of the particulate metal and/or semi-metal oxide with the smallest sedimentation mass is between 70% and 100%, preferably between 75% and 100%, further preferably between 80% and 100%, still further preferably between 85% and 100%, further preferably between 90% and 100%, and most preferably between 95% and 100% of the sedimentation mass of the particulate metal and/or semi-metal oxide with the largest sedimentation mass.

Due to the coating suspension according to the invention, it is advantageously achieved that even a coating process carried out over a longer period of time with a comparatively long drying period, for example of several hours, does not lead to a layered deposition of the different particulate metal and/or semi-metal oxides on a catalyst substrate. Furthermore, due to the coating suspension according to the invention, it is also achieved that a comparatively very small sedimentation of components that sediment more quickly takes place in containers and/or pipes in which the coating suspension according to the invention is stored or conveyed.

In addition, the catalyst substrates can also be coated using the coating suspensions according to the invention in an immersion, suction, pumping or centrifugation process, wherein although the total concentration of the particles in the coating suspension changes due to sedimentation of the solid particles, the ratios of the particles to each other remain the same both in the coating suspension and in the coating. Thus, the composition of the applied (dried) coating also corresponds to the composition of the solid constituents of the original coating suspension. In addition, with the coating suspension according to the invention, a layered deposition of the particulate metal and/or semi-metal oxides occurs to a lesser extent than with known coating suspensions. Thus, a very homogeneous coating with very good catalytic properties forms.

However, minimizing the sedimentation behavior for suspensions does not just offer advantages for at least 2 solid components in a washcoat. The present invention also lends itself to suspensions which contain only one powder component, although this is less preferred, as advantages for process engineering can thus also be achieved.

For example, there is thus no need for continuous or rigorous stirring in the production of the washcoat in large receiver containers and no solid or particle gradient from the upper liquid range to the lower forms. The deposition of the washcoat in stirring tube systems thus also decreases significantly (shorter purification and fewer problem cases due to sedimentation).

In addition, in this case, the viscosity of the washcoat increases with falling particle size distribution (due to larger surface area, also greater wetting). Thus, despite a relatively low solids content, higher loadings can be achieved, or also an effect incurred on the layer thickness that forms, which results in a better adhesion of the washcoat on the substrate or support. An effect on the spatial distribution of the particles in a honeycomb or in the wall of the honeycomb or also for DPFs (diesel particulate filters) can thus also be advantageously controlled (in particular whether the particles of the washcoat are to adhere/sit inside or outside the pores).

The expression "sedimentation speed" here refers to the vertical speed at which a particle settles (sediments) inside a fluid medium. In the following, rather than individual particles, a plurality of particles which have the same chemical composition (same sort of particles), for example metal and/or semi-metal oxides, such as aluminium oxide, silicon dioxide, silicon-aluminium oxide, zirconium dioxide, tin oxide, titanium dioxide, cerium oxide, cerium zirconium oxide, etc., is considered. The particles of a particular type have the same density of the material $\rho$ (g/cm$^3$), but can differ in their average diameter d ($\mu$m). This is explained in even more detail below.

The expression "sedimentation mass $M_S$" here refers to the mass in grams (g) ascribed to a type of particles with a particular density $\rho$ (g/cm$^3$) and an average diameter d ($\mu$m) of the particles. In the explanation below, the frictional resistance of the particles caused by the vertical movement in the liquid is disregarded. In addition, it is assumed for simplification that the particles are spherical.

The sedimentation force is the force that causes the particles to accelerate vertically downwards. The sedimentation force is expressed as the difference between the sinking force and the buoyancy force which act on the particles. The sinking force is expressed as the product of the particle volume or the average particle volume $V_{particle}$ ($\mu$m$^3$) and the density of the particles $\rho_{particle}$ and the gravitational acceleration g (9.81 m/s$^2$) (see equation 1).

$$F_{sinking\ force} = V_{particle} \cdot \rho_{particle} \cdot g \quad (1)$$

The buoyancy force is the product of the average particle volume $V_{particle}$ (μm³) and the density of the liquid $\rho_{liquid}$ and the gravitational acceleration g (see equation 2).

$$F_{buoyancy\ force} = V_{particle} \cdot \rho_{liquid} \cdot g \quad (2)$$

The sedimentation force is then expressed according to equation 3 as the difference between the sinking force ($F_{sinking\ force}$) and buoyancy force ($F_{buoyancy\ force}$) from equations 1 and 2.

$$F_{sinking\ force} - F_{buoyancy\ force} = V_{particle} \cdot g \cdot (\rho_{particle} - \rho_{liquid}) \quad (3)$$

The sedimentation force causes the particles to accelerate vertically downwards and can also be represented as $F_{sedimentation} = M_S \cdot g$. Taking into account the above relation, the sedimentation mass $M_S$ results from equation 3 by dividing equation 3 by the gravitational acceleration g:

$$M_S = V_{particle} \cdot (\rho_{particle} - \rho_{liquid}) \quad (4)$$

The volume of a type of particles results from the average diameter d (μm) of the particles as:

$$V_{particle} = 4/3 \cdot (d/2)^3 \cdot \pi \quad (5)$$

Thus the sedimentation mass results, depending on the average diameter of the particles, from equations 4 and 5 as:

$$M_S = 4/3 \cdot (d/2)^3 \cdot \pi \cdot (\rho_{particle} - \rho_{liquid}) \quad (6)$$

According to equation 6, a sedimentation mass $M_S$ is assigned to each type of particles which are used to produce the coating suspension. To calculate the sedimentation mass $M_S$ according to equation 6, it is necessary to know the density of the material of the particles and the liquid as well as the average diameter of the particles. Thus, for example the sedimentation mass of aluminium oxide with a specific average diameter is expressed as:

$$M_{S(aluminium\ oxide)} = 4/3 (d_{aluminium\ oxide}/2)^3 \cdot \pi \cdot (\rho_{aluminium\ oxide} - \rho_{liquid}) \quad (7)$$

The average diameter of the particles used is determined by means of laser diffractometry e.g. with a Malvern Mastersizer 2000 (obtainable from Malvern Instruments GmbH, Germany).

The density of the material of the particles is determined using customary measurement methods. The principle is that the volume expelled by the body to be examined is determined by weighing using a pycnometer. The pycnometer is filled with water or another suitable liquid up to a specific mark. The total mass M is then determined by weighing. Then, some of the liquid is removed and the body to be measured with the mass m is placed in the pycnometer. If the pycnometer is then filled at the same temperature as previously up to the same mark, the total mass M' can be ascertained.

In order to achieve the advantages according to the invention of the coating suspension, it suffices to take the density of the liquid of the coating suspension in equation 6 to be approx. 1 g/cm³, as most suspensions are based on water as suspension agent.

It is further preferred that the precise density of the mixture of all liquid and soluble constituents of the coating suspension is used as the density of the liquid of the coating suspension which is used in equation 6. This then includes for example the solvent as well as additives such as binders and other soluble constituents. The density of this composition can be determined for example using the DMA 38 (obtainable from Anton Paar, Austria), which operates on the flexural vibration principle. The flexural vibration density meter is based on the principle of a U-tube which has a resonant frequency that is inversely proportional to the square root of its mass. The volume of the tube is given and the density of the liquid with which it is filled is calculated starting from its resonant frequency.

The coating suspension according to the invention is characterized in that the particulate metal and/or semi-metal oxides contained therein (also particles below) have a similar sedimentation mass $M_S$, as defined above. In order to set the sedimentation mass $M_S$ of the different types of particulate metal and/or semi-metal oxides according to the invention, a person skilled in the art can for example first fix the sedimentation mass of one type of particles. The desired average diameter of this type of particles is then taken as the basis for the further calculations. The sedimentation mass of this type of particles can then be calculated directly from equation 6.

Depending on the density of the material of the remaining types of metal and/or semi-metal oxides, the average diameter suitable in each case for each type of particles is obtained from equation 6, taking into account the similarities according to the invention of the sedimentation masses of the different types of particles. A person skilled in the art can here freely choose which type of particles for example is to have the largest or the smallest sedimentation mass.

If a particularly precise calculation according to the above-mentioned preferred embodiment is to take place, the density of the solution of the suitable liquid or soluble constituents of the coating suspension can be determined and the sedimentation mass of the chosen types of metal and/or semi-metal oxides can be determined according to equation 6.

A calculation example based on one type of particles with a determined density and a known average diameter $d_1$ is given below, in which the sedimentation mass $M_{S1}$ of the type of particles is obtained. The suitable average diameter of the second type of particles $d_2$ is then calculated by equating the sedimentation mass $M_{S1}$ to the sedimentation mass $M_{S2}$ of the second type of particles. Of course, the sedimentation mass $M_{S1}$ within the framework of the invention, as defined above, can differ from the sedimentation mass $M_{S2}$ and the following calculation is to be understood only as an example:

$$M_{S1} = M_{S2} \quad (8)$$

The calculation results, using equation 6 and corresponding mathematical transformations, in:

$$(d_2/2)^3 \cdot (\rho_{particle\ 2} - \rho_{liquid}) = (d_1/2)^3 \cdot (\rho_{particle\ 1} - \rho_{liquid}) \quad (9)$$

It follows from equation 9 that:

$$d_2 = d_1 ((\rho_{particle\ 1} - \rho_{liquid})/(\rho_{particle\ 2} - \rho_{liquid}))^{1/3} \quad (10)$$

The calculated average diameter of a type of particles can be set in any way. For example this can be done by grinding the particles, wherein the grinding can generally be carried out wet or dry. Here, a wet grinding is preferred, in which a suspension is first produced and then pumped through a grinding cylinder which is filled with grinding balls. Suitable mills are a Dyno®-Mill (obtainable from Willy A. Bachofen AG, Germany) or mills which are obtainable from Erich Netzsch GmbH & Co. Holding KG, Germany.

As it is technically not possible that every particle of a type of particles will have the exact same diameter, the sedimentation mass of the individual particles fluctuates within a type of particles, depending on the diameter of these particles.

According to the invention, therefore, it is additionally preferred that the particles of a specific type of particles have as small as possible a deviation from the average diameter and thus only small differences in the sedimentation masses and sedimentation speeds occur within a type of particles. In this way, the properties of the coating suspension can be further improved. It is particularly preferred that the standard deviation of the individual particles from the average diameter of the particles is less than 30%, further preferably less than 25%, still further preferably less than 20%, further preferably less than 15%, further preferably less than 10%, still further preferably less than 5%, and most preferably less than 3%. The calculation of the standard deviation is taken as a basis for a particle size distribution, which is determined using the above-described measurement methods. The calculation then takes place according to usual methods. In a further preferred embodiment, 90% of the particles have a diameter that does not deviate from the average diameter by more than 20%, further preferably not by more than 10%. In order to check whether the particles of a type meet this criterion, the diameters of 20 particles are preferably determined by random sampling according to the above-described measurement method, and evaluated.

Particularly advantageous coating suspensions can be produced if all particulate or solid constituents used have a similar sedimentation mass $M_S$. Here, the average diameters of a type of constituents, such as for example particulate plastics as pore formers, can also be determined. Thus, preferably in addition to the particulate metal and/or semi-metal oxides, all other solid particulate constituents of the coating suspension also have a similar sedimentation mass, with the result that the sedimentation mass $M_S$ of the particulate constituent with the smallest sedimentation mass is between 70% and 100%, preferably between 75% and 100%, further preferably between 80% and 100%, still further preferably between 85% and 100%, further preferably between 90% and 100%, and most preferably between 95% and 100% of the sedimentation mass of the particulate constituent with the largest sedimentation mass.

The coating suspension according to the invention comprises at least two, further preferably at least three, still further preferably at least four, further preferably at least five, further preferably at least six, still further preferably seven and most preferably at least eight, different particulate metal and/or semi-metal oxides which have the sedimentation mass $M_S$ according to the invention.

The particulate metal and/or semi-metal oxides, i.e. the different types of particles, are preferably selected from the group consisting of support materials, promoters, oxygen storage components, stabilizers, trapping materials and fillers. The members of the above-named group represent an umbrella term for metal and/or semi-metal oxides with specific properties. The properties of the metal and/or semi-metal oxides as well as their use are known to a person skilled in the art. The coating suspension according to the invention particularly preferably comprises at least two, further preferably at least three, further preferably at least four and most preferably at least five particulate metal and/or semi-metal oxides, which are to be allocated to different members of the group given above on the basis of their properties.

In addition, the coating suspension can also have further metal and/or semi-metal oxides which are not to be allocated to the group given above on the basis of their properties.

Suitable support materials are surface-rich metal and/or semi-metal oxides. A support material is preferably selected from the group consisting of aluminum oxide, silicon dioxide, silicon-aluminum oxide, zirconium dioxide, titanium dioxide, vanadium oxide, cerium oxide, cerium zirconium oxide and a zeolite. The inorganic support material is further preferably selected from the group consisting of aluminum oxide, cerium zirconium oxide and cerium oxide. At least two different support materials are still further preferably selected from the above-named group.

The group of promoters preferably comprises: tin oxide or lanthanide oxides, in particular cerium oxide, praseodymium oxide $Pr_6O_{11}$ or neodymium oxide $Nd_2O_3$.

The group of stabilizers preferably comprises: tungsten oxide, lanthanum oxide, zirconium dioxide, silicon dioxide, yttrium oxide, cerium oxide, iron oxide and tin oxide.

The group of trapping materials preferably comprises: zeolites or alkaline-earth metal oxides, in particular zeolites, which are present in the H-form or are metal ion-exchanged zeolites. Preferred alkaline-earth metal oxides are CaO, BaO or SrO, which can be used as trapping material for trapping NOx.

The group of fillers preferably comprises: cordierite, mullite, magnesium aluminum titanate and mixtures thereof.

The coating suspensions according to the invention can preferably contain a catalytically active metal. However, the catalytically active metal can also be applied to the catalyst surface separately after the coating of the catalyst substrate with the coating suspension. If the catalytically active metal is a constituent of the coating suspension, it can be used in dissolved or solid form, preferably in dissolved form.

The catalytically active metals are preferably selected from the group consisting of palladium, platinum, rhodium, silver, gold, iridium and ruthenium, more preferably from the group consisting of platinum, palladium, rhodium, silver and gold.

The coating suspension can furthermore contain a pore former. This pore former is burned out in a calcining step during the production of a catalyst and leaves pores in the coating. The increase in the porosity enlarges the surface area of the coating and thus increases the catalytic activity of the catalyst. For example, organic materials, such as for example cellulose or polyvinyl alcohol, can be used as pore formers.

The pore former preferably comprises a polymer or copolymer, selected from the group consisting of polyethylene, polypropylene, polyurethanes, polyacrylonitriles, polyacrylate, polyvinyl acetate and polystyrene. Furthermore, mixtures, i.e. blends, of the above-named polymers can also be used. The named polymers are low-cost representatives of emulsion polymerizates. Furthermore, the above-named polymers or their copolymers combust residue-free.

The pore former furthermore preferably comprises a synthetic resin. This synthetic resin is e.g. a polystyrene resin, polypropylene resin or polypropylene-polyethylene resin. By synthetic resins are meant within the framework of this invention synthetic resins according to DIN 55958 (December 1988), which are produced by polymerization, polyaddition or polycondensation reactions. They can be modified by natural materials, such as for example vegetable or animal oils or natural resins, or can have been produced by esterification or saponification of natural resins. The synthetic resins are largely amorphous polymer products without a sharp softening or melting point.

Polymeric pore formers, such as described in United States patent application publication 2009/0162649, are preferably used. These have a particle size with an average diameter of from 0.5 to 2 µm, further preferably of from 0.7 to 1.5 µm and still further preferably of about 1 µm.

In addition, the coating suspensions according to the invention can additionally preferably contain inorganic sols or gels, in particular $SiO_2$, $TiO_2$, $Al_2O_3$ sols or gels for improving the adhesion of the resultant coating, additives such as organic monomers and polymers, in particular cellulose derivatives or acrylates as pore formers and as adhesion promoters and/or surfactants as rheological excipients, as well as binders, such as e.g. sols.

Water is preferably used as solvent for the coating suspensions. A person skilled in the art knows the quantities suitable for this, or can easily determine them.

The present invention also relates to a method for producing a coating suspension with the steps of:
providing a suspending liquid which has a density $\rho_{liquid}$,
providing at least two different particulate metal and/or semi-metal oxides,
setting the average diameters of the particulate metal and/or semi-metal oxides in such a way that the sedimentation mass $M_S$ of the particulate metal or semi-metal oxide with the smallest sedimentation mass is between 70% and 100% of the sedimentation mass of the particulate metal or semi-metal oxide with the largest sedimentation mass $M_S$, wherein the respective sedimentation mass $M_S$ is calculated according to the formula $M_S=4/3 (d/2)^3 \cdot \pi \cdot (\rho - \rho_{liquid})$, wherein d is the average diameter and $\rho$ is the density of the respective particulate metal and/or semi-metal oxide,
suspending the particulate metal and/or semi-metal oxides with the set average diameters in the suspending liquid.

Further constituents of the coating suspension, such as the catalytically active metals, additives, etc., are processed with the particulate metal and/or semi-metal oxides to form the coating suspension according to usual methods.

The present invention also relates to the use of a coating suspension according to the invention to coat a catalyst substrate.

The coating suspensions according to the invention are preferably used to coat catalysts with a honeycomb body, preferably a honeycomb body with a complex structure, in particular a honeycomb body with open channel structures.

The coating suspensions according to the invention are preferably used in coating processes which include an immersion, suction, pumping or centrifugation process.

The present invention additionally relates to catalysts which have been produced using the coating suspension according to the invention. The production of the catalysts according to the invention, in particular the coating process with the coating suspension according to the invention, can be carried out here in the usual way.

The coating suspension according to the invention is advantageous in particular in production methods in which the coating suspension is in the liquid state in containers and/or pipes or on the catalyst substrate for a long time and a sedimentation of the particles contained in the coating suspension can occur.

The coating suspension according to the invention is preferably used to coat catalysts which are used as diesel particulate filters, diesel oxidation catalysts, NOx trap catalysts or for selective catalytic reduction (SCR).

DESCRIPTION OF THE PREFERRED EMBODIMENTS OF THE INVENTION

The examples below serve to explain the invention and are not to be regarded as limiting.

Examples

Example 1

Production of a Coating Suspension According to the Invention

Three individual aqueous suspensions were prepared with the respective components $SnO_2$, Fe-beta zeolite and $\gamma$-$Al_2O_3$ in distilled water, to which 2 wt.-% 60% acetic acid has been added. Starting with one component, the resultant sedimentation mass $M_S$ was determined from particle density, average particle diameter and suspending liquid density. The necessary average particle diameters of the remaining two components were then calculated, which result in the same sedimentation mass. To set the calculated average particle diameters, a wet grinding of the remaining two suspensions was carried out, with the result that the remaining two components had the necessary average particle diameters. Then, the three individual suspensions were combined such that the obtained coating suspension contained 10 wt.-% $SnO_2$, 10 wt.-% Fe-beta zeolite and 30 wt.-% $\gamma$-$Al_2O_3$, relative to the coating suspension. The respective average particle diameters were $SnO_2$:Fe zeolite:$Al_2O_3$=3 μm:7.7 μm:4.2 μm. The obtained particle diameter ratio $SnO_2$:Fe-beta zeolite:$\gamma$-$Al_2O_3$ of the coating suspension was thus 1:2.6:1.4.

The obtained suspension was then poured into a separating funnel. Once a visible sedimentation had taken place, suspension samples were taken at different layer heights and their composition examined. It was found that the suspension samples taken had approximately the same ratios of the components regardless of the layer height from which they had been taken, i.e. regardless of the respective suspension state.

Example 2 (Comparison Example)

Production of a Known Coating Suspension

The same three individual aqueous suspensions as in Example 1 were prepared. However, unlike in Example 1, the average particle diameter of the individual suspensions was not set, but the individual suspensions were mixed after their production in the same ratio as in Example 1.

The obtained suspension was then poured into a separating funnel. Once a visible sedimentation had taken place, suspension samples were taken at different layer heights and their composition examined. It was found that the suspension samples taken had significantly different ratios of the components depending on the layer height from which they had been taken, i.e. depending on the respective suspension state.

It is understood that the foregoing description is that of the preferred embodiments of the invention and that various changes and modifications may be made thereto without departing from the spirit and scope of the invention as defined in the appended claims.

What is claimed is:

1. Coating suspension for coating catalyst substrates, comprising at least two different particulate metal and/or semi-metal oxides with a sedimentation mass ($M_S$), wherein the sedimentation mass ($M_S$) of the particulate metal and/or semi-metal oxide with the smallest sedimentation mass is between 70% and 100% of the sedimentation mass of the particulate metal and/or semi-metal oxide with the largest sedimentation mass.

2. Coating suspension according to claim 1, wherein the particulate metal and/or semi-metal oxides are selected from the group consisting of support materials, promoters, oxygen storage components, stabilizers, trapping materials and fillers.

3. Coating suspension according to claim 2, wherein the support material is selected from the group consisting of aluminum oxide, silicon dioxide, silicon-aluminum oxide, zirconium dioxide, titanium dioxide, cerium oxide, cerium zirconium oxide and a zeolite.

4. Coating suspension according to claim 2, wherein the promoter is a tin oxide or a lanthanide oxide.

5. Coating suspension according to claim 2, wherein the stabilizer is selected from the group consisting of tungsten oxide, lanthanum oxide, zirconium dioxide, silicon dioxide, yttrium oxide, cerium oxide, iron oxide and tin oxide.

6. Coating suspension according to claim 2, wherein the trapping material is a zeolite or an alkaline-earth metal oxide.

7. Coating suspension according to claim 2, wherein the filler is selected from the group consisting of cordierite, mullite, magnesium aluminum titanate and mixtures thereof.

8. Method for producing a coating suspension with the steps of:
  providing a suspending liquid which has a density ($\rho_{liquid}$),
  providing at least two different particulate metal and/or semi-metal oxides,
  setting the average diameters of the particulate metal and/or semi-metal oxides in such a way that the sedimentation mass ($M_S$) of the particulate metal or semi-metal oxide with the smallest sedimentation mass is between 70% and 100% of the sedimentation mass of the particulate metal or semi-metal oxide with the largest sedimentation mass ($M_S$), wherein the respective sedimentation mass ($M_S$) is calculated according to the formula $M_S=4/3(d/2)^3 \cdot \pi \cdot (\rho - \rho_{liquid})$, wherein d is the average diameter and $\rho$ is the density of the respective particulate metal and/or semi-metal oxide,
  suspending the particulate metal and/or semi-metal oxides with the set average diameters in the suspending liquid.

9. Method of coating a catalyst substrate comprising preparing the coating suspension according to claim 1.

10. Method according to claim 9, wherein the catalyst substrate to be coated is a honeycomb body.

11. Method according to claim 9, wherein the coating takes place by an immersion, suction, pumping or centrifugation process.

12. Catalyst, produced using a coating suspension according to claim 1.

13. Catalyst according to claim 12, wherein the catalyst is a diesel particulate filter, a diesel oxidation catalyst, an NOx trap catalyst or a catalyst for selective catalytic reduction.

* * * * *